(12) United States Patent
Bulusu et al.

(10) Patent No.: US 7,444,667 B2
(45) Date of Patent: Oct. 28, 2008

(54) METHOD AND APPARATUS FOR TRUSTED BLADE DEVICE COMPUTING

(75) Inventors: Mallik Bulusu, Olympia, WA (US); Vincent J. Zimmer, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 891 days.

(21) Appl. No.: 10/629,038

(22) Filed: Jul. 28, 2003

(65) Prior Publication Data

US 2005/0028000 A1    Feb. 3, 2005

(51) Int. Cl.
*G06F 21/00*    (2006.01)
*H04L 9/00*    (2006.01)

(52) U.S. Cl. .................. 726/1; 726/2; 380/282; 713/193

(58) Field of Classification Search .................. 713/193, 713/168; 726/2, 1; 380/282
See application file for complete search history.

(56) References Cited

OTHER PUBLICATIONS

By Steve Rokov, Using Embedded Platform Management With WBEM/CIM, Jun. 2003, Computer Technology Review, vol. XXIII No. 6, www.wwpi.com, West world production, retrieved date Jul. 10, 2007.*

* cited by examiner

*Primary Examiner*—Gilberto Barron, Jr.
*Assistant Examiner*—Samson B Lemma
(74) *Attorney, Agent, or Firm*—Shireen Irani Bacon

(57) ABSTRACT

A method and system are disclosed for performing trusted computing for blade devices, such as blade servers or other blade devices. The computing domain for the blade devices is managed by a chassis management logic module. Methods for performing blade capability authorization and optional blade authentication are provided. A method for performing blade device boot processing is also provided.

19 Claims, 9 Drawing Sheets

METHOD AND APPARATUS FOR TRUSTED BLADE DEVICE COMPUTING

BACKGROUND

1. Technical Field

The present disclosure relates generally to information processing systems and, more specifically, to trusted computing for blade devices.

2. Background Art

In computing environments, security has become an issue of increasing concern. Computing devices execute firmware and/or software code to perform various operations. The code may be in the form of user applications, BIOS (basic input/output system) routines, operating system routines, etc. The code is often vulnerable to corruption by viruses and other detrimental interference by unauthorized parties. Such corruption, which is typically deliberate, may simply interfere with the normal operation of the system, may destroy files and other important data, and may even be used to surreptitiously gain access to classified information. Various security measures have been developed to protect computer systems from such corruption.

One approach to making computing systems more secure is the implementation of a trusted computing environment. In some such trusted computing environments, integrity metrics are collected and reported in order to determine the state of the hardware and software environment.

Implementing a trusted computing environment for blade devices poses interesting issues. A blade device is a component (typically a hot-swappable device) in a multi-component system that is designed to accept some number of components (blade devices). Blade devices may include, for example, individual servers that plug into a multiprocessing system. Blade devices may also include, for example, individual port cards that add connectivity to a switch.

A blade server is a modular electronic circuit board containing one or more microprocessors and a memory. Typically, a blade server is intended for a single, dedicated application such as serving and caching World Wide Web pages, file sharing, or streaming audio and/or video content. A typical blade server can be easily inserted into a space-saving rack with many similar servers.

A typical blade server system includes two or more blade server units in a chassis (often referred to as a "rack") along with a single chassis management module ("CMM") for the chassis. This disclosure addresses problems related to managing, with a single management module, trust functions such as authentication and capability registration for a plurality of blade devices.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for trusted computing for blade devices.

DETAILED DESCRIPTION

Described herein are selected embodiments of a system, apparatus and methods related to trusted computing in a blade device environment. In the following description, numerous specific details such as blade device types, blade system configurations, control flow ordering, and formats for data storage have been set forth to provide a more thorough understanding of the present invention. It will be appreciated, however, by one skilled in the art that the invention may be practiced without such specific details. Additionally, some well-known structures, circuits, and the like have not been shown in detail to avoid unnecessarily obscuring the present invention.

Figure 1:
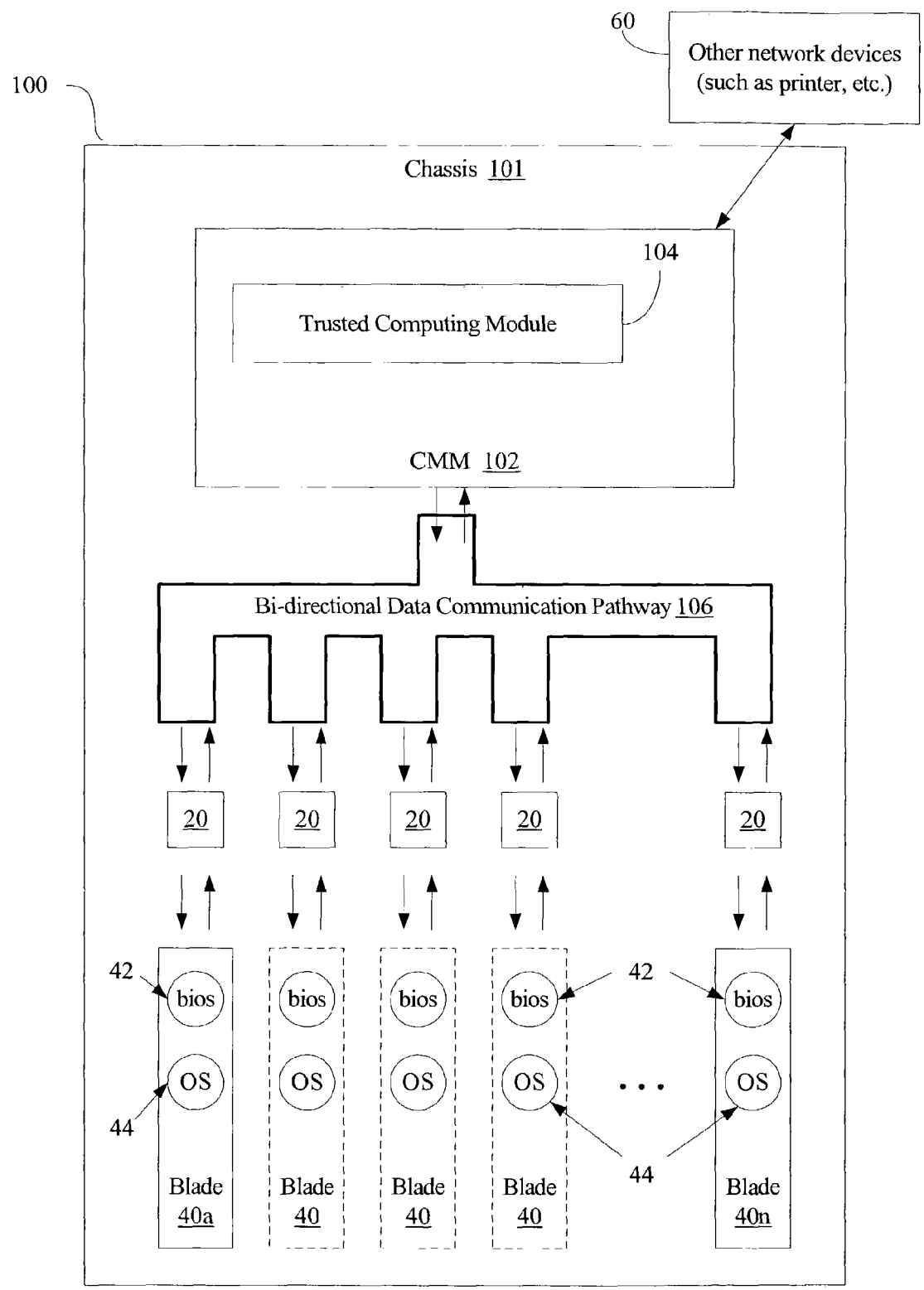
FIG. 1 is a block diagram of a blade system capable of utilizing disclosed techniques.

FIG. 1 illustrates a system 100 capable of utilizing disclosed techniques to implement managed trusted computing for blade devices. The system 100 includes a chassis 101 (also interchangeably referred to herein as a "rack"). The rack 101 receives and houses one or more blade devices 40a-40n. The rack 101 also houses a chassis management module ("CMM") 102. For at least one embodiment, the CMM 102 includes chassis management logic that runs on a processor (not shown). For example, the CMM 102 logic may run on a backplane processor (such as, for example, backplane processor 902 illustrated in FIG. 9).

FIG. 1 further illustrates that the CMM 102 logic communicates with blade devices 40a-40n via a bi-directional data communication pathway 106. The pathway 106 may be, for at least one embodiment, a data bus.

Associated with each blade device 40 is a baseboard memory controller ("BMC") 20. The BMC 20 controls communication between the blade device 40 and the CMM 102. BMC 20 thus acts as a mezzanine layer for communications between the blade device 40 and the CMM 102. Although shown in FIG. 1 as being logically distinct from its associated blade device 40, a BMC 20 may of course be physically included within a blade's 40 hardware. Also, for at least one embodiment, a single BMC 20 may act as a mezzanine layer for all of the blade devices 40a-40n in a chassis 101.

A blade device 40 may include both hardware and software components. For at least one embodiment, a blade device 40 is a blade server. Each blade device 40 includes one or more processors (not shown). In addition to the processor(s) (such as, for example, processors 1004 illustrated in FIG. 9), each blade device 40 may include software components such as basic input/output system ("BIOS") logic 42 and operating system software 44. As will be discussed in further detail below, the BIOS logic 42 may include one or more modules to support a trusted computing environment. The BIOS logic 42 may be implemented as software, firmware, hardware logic, or a combination of any or all of these approaches.

For at least one embodiment, the BIOS logic 42 may include logic to support capability registration. For at least one other embodiment, the BIOS logic 42 includes optional logic to support authentication. For at least one other embodiment, operating system software 44 also includes code to support capability registration.

FIG. 1 illustrates that the CMM 102 logic may include a trusted computing module 104. For at least one embodiment, the trusted computing module 104 includes data and one or more logic modules. As is discussed in further detail below, the trusted computing module 104 manages trusted computing processes, such as authentication and capability-based authorization, for blade devices 40a-40n.

Figure 2:
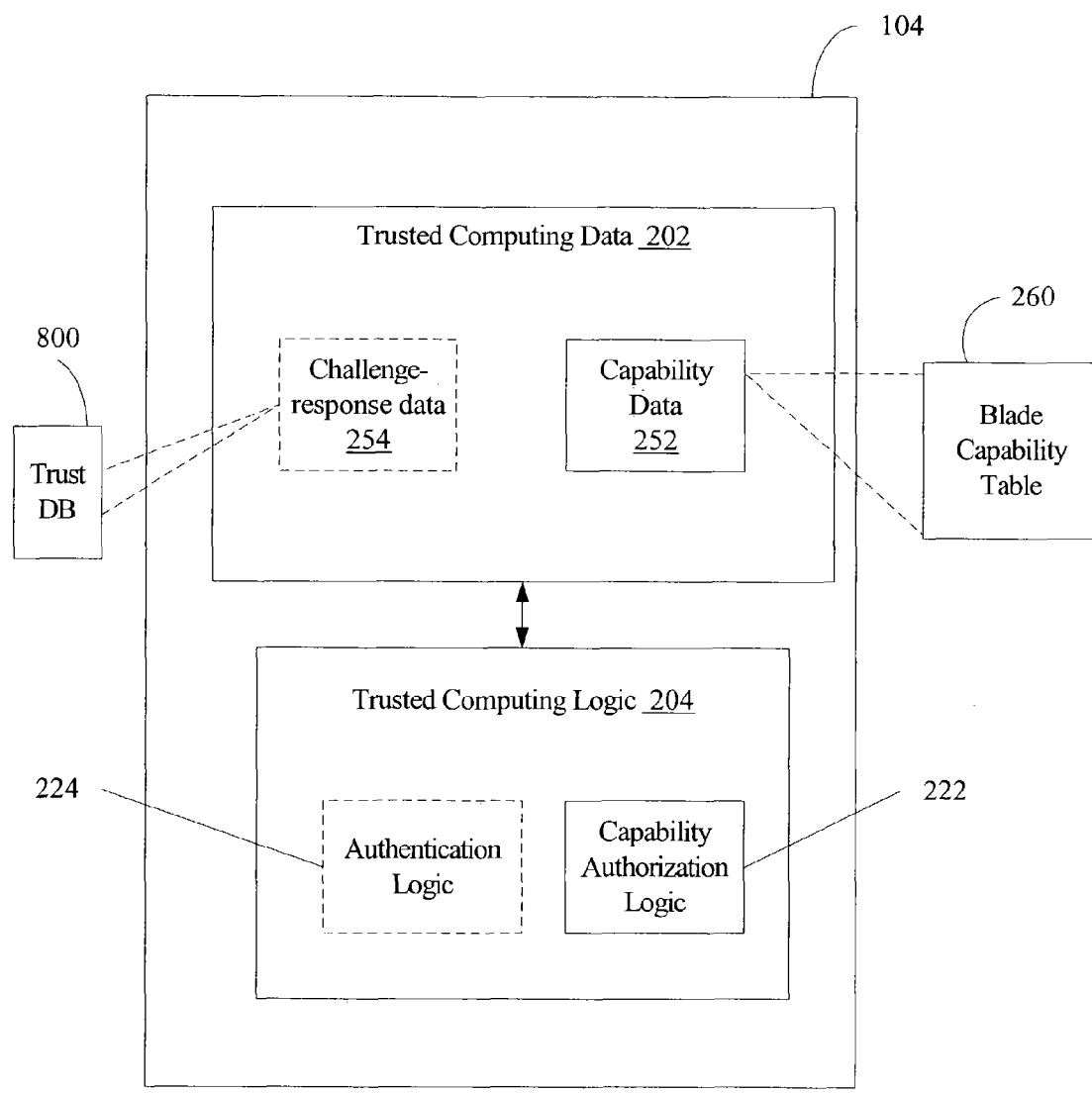
FIG. 2 is a block diagram illustrating at least one embodiment of a trusted computing module.

FIG. 2 illustrates the trusted computing module 104 in further detail. The trusted computing module 104 includes trusted computing logic 204 and trusted computing data 202. Trusted computing data 202 may include capability data 252, which is a data store of information regarding capabilities of one or more of the blade devices 40a-40n (FIG. 1). FIG. 2 illustrates that all or part of capability data 252 may be maintained as a table 260.

Trusted computing data 202 may also include optional challenge-response data 254. The optional nature of challenge-response data 254 is indicated by broken lines in FIG. 2. The challenge-response data 254 may include a trust database 800 that maintains a list of entries (such as, for example, an access control list ("ACL")) to store trust information relevant to challenge-response authentication of one or more of the blade devices 40a-40n (FIG. 1).

FIG. 2 further illustrates that trusted computing logic 204 may include capability authorization logic 222 and may also include optional authentication logic 224. Broken lines in FIG. 2 denote the optional nature of authentication logic 224.

FIG. 1 is referenced along with FIG. 2 for further discussion of capability authorization logic 222 and optional authentication logic 224. The capability authorization logic 222 is to perform a capability-based authorization process for blade devices 40a-40n. During capability-based authorization, the CMM 102 acts a policy agent to determine whether a particular blade device 40 should be authorized to join the operational network, referred to as a computing domain, which is managed by the CMM 102. In this manner, the CMM 102 determines whether a particular blade device 40 is authorized to communicate with other blade devices 40a-40n and other network devices 60 in the computing domain, and to otherwise participate in network services provided by the CMM 102.

As used herein, a computing domain is a networked group of blade devices that are administered as a unit with common rules and procedures. The computing domain may include other network devices 60 such as peripheral devices that may include, for instance, a printer.

For at least one embodiment, trusted computing logic 204 further includes optional authentication logic 224. The authentication logic 224 is to perform optional authentication processing to determine whether a blade device 40 may be permitted, based upon a challenge-response sequence, to enter the operational network of blade devices 40a-40n that form the current computing domain managed by the CMM 102 (FIG. 1). If the blade device 40 successfully performs the challenge-response sequence, it is said to be "trusted."

Figure 3:
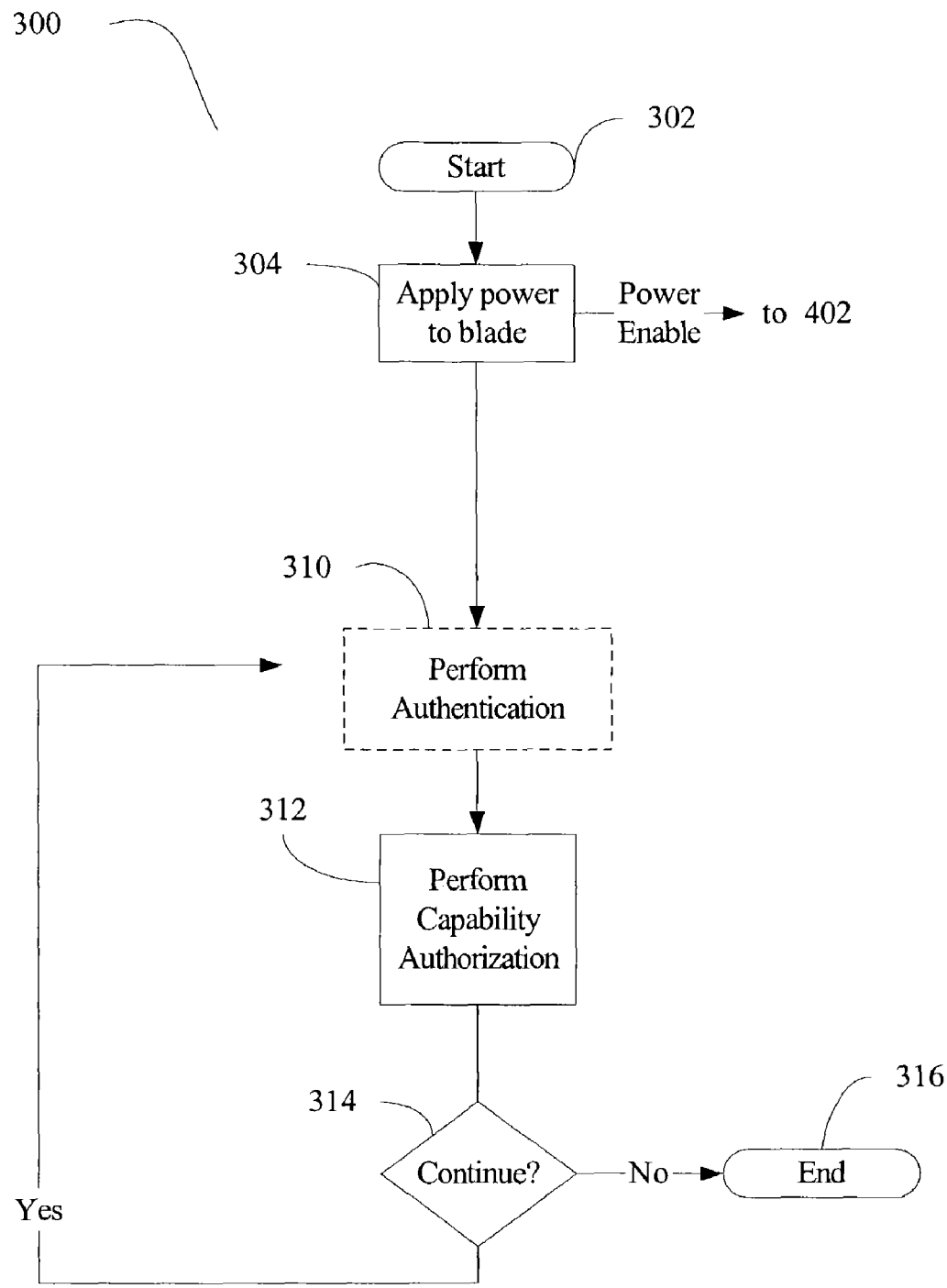
FIG. 3 is a flowchart illustrating at least one embodiment of a method for managing a trusted computing domain for blade devices.

FIG. 3 is a flowchart illustrating at least one embodiment of a method 300 for managing trusted computing among blade devices. For at least one embodiment, the method 300 is performed by central management logic for the blade devices, such as CMM 102 logic illustrated in FIG. 1. FIG. 3 and FIG. 1 are referenced together in the following discussion of the method 300.

FIG. 3 illustrates that the method 300 begins at block 302, which is labeled "Start." The method 300 may run, for at least one embodiment, in a continuous loop as long as power is applied to the chassis 101. Accordingly, the method 300 begins 302 any time that power to the chassis 101 transitions from an "off" state to an "on" state, such as at initial power up or after a power cycle.

FIG. 3 illustrates that processing proceeds to block 304, where power is applied to at least one blade, which is referred to herein as a current blade device. One of skill in the art will recognize that the method 300 may be applied to any or all of the blade devices 40a-40n in the chassis 101 and that when a current blade device is discussed, it should be understand that such actions may be taken with respect to a plurality of blade devices.

That is, for at least one embodiment, the CMM 102 performs the method 300 for multiple blade devices 40a-40n concurrently. The specific details regarding implementation of such concurrent processing are not limited to the embodiments discussed herein. Such concurrent processing may be implemented, for instance, as an arbitrated time-slice scheme. Alternatively, for at least one other embodiment, the concurrent processing is implemented via multi-threading.

At block 304, the method 300 forwards a power enable indicator, "power enable", to the current blade. That is, the BMC 20 for a current blade device 40 will not permit the blade device to perform a power up boot routine unless the power enable indicator has been issued 304 and has been received by the BMC 20 (see block 402 in FIG. 4). Processing then proceeds to optional block 310. For an embodiment that does not perform optional block 310, processing proceeds from block 304 to block 312.

At block 310, the method 300 optionally performs authentication for the current blade device to determine whether the blade device should be permitted to enter the computing domain. For at least one embodiment, authentication 310 is performed by executing optional authentication logic 224 (FIG. 2). Processing then proceeds to block 312.

The purpose of authentication 310 is to determine whether the current blade device meets certain criteria that indicate that the current blade device may be trusted. For at least one embodiment, these criteria are designed to correspond to a particular trust standard. Several trust standards are known in the art. These standards are designed to address concerns regarding security of data and hardware in network environments. Such standards include standards promulgated by the Trusted Computing Group and available on the Internet at http://www.trustedcomputinggroup.org/downloads/.
Another such standard is the IEEE 1363-2000: Standard Specifications for Public Key Cryptography promulgated by the Institute of Electrical and Electronics Engineers and available on the Internet at http://standards.ieee.org/catalog/olis/busarch.html.

At block 312, the method 300 performs capability authorization for the current blade device. During capability authorization 312, it is determined whether the current blade's capabilities match the capabilities required by a current trusted computing policy, which is sometimes referred to herein as a capability policy. For at least one embodiment, the CMM 102 performs capability authorization 312 by executing capability authorization logic 222 (FIG. 2). Even a trusted blade device that is successfully authenticated 310 may nonetheless be isolated from the computing domain if the trusted blade device's capabilities do not meet those required by the current capability policy. If the capabilities of a given blade device 40 do not match those capabilities required by a capability policy, then it is said that the blade device capabilities do not "match" the capability policy.

If it is determined at block 314 that power is still being applied to the chassis 101, processing loops back to block 310 to determine if authentication processing for more blades should be performed. Otherwise processing ends at block 316. One of skill in the art will recognize that, in practice, the method 300 may be implemented to loop to block 310 from block 312, without a power check 314. In such embodiment, the method 300 is a continuous loop that is performed until an exception event, such as loss of power to the chassis 101, occurs. Upon the occurrence of such exception event, processing ends at block 316.

Figure 5:
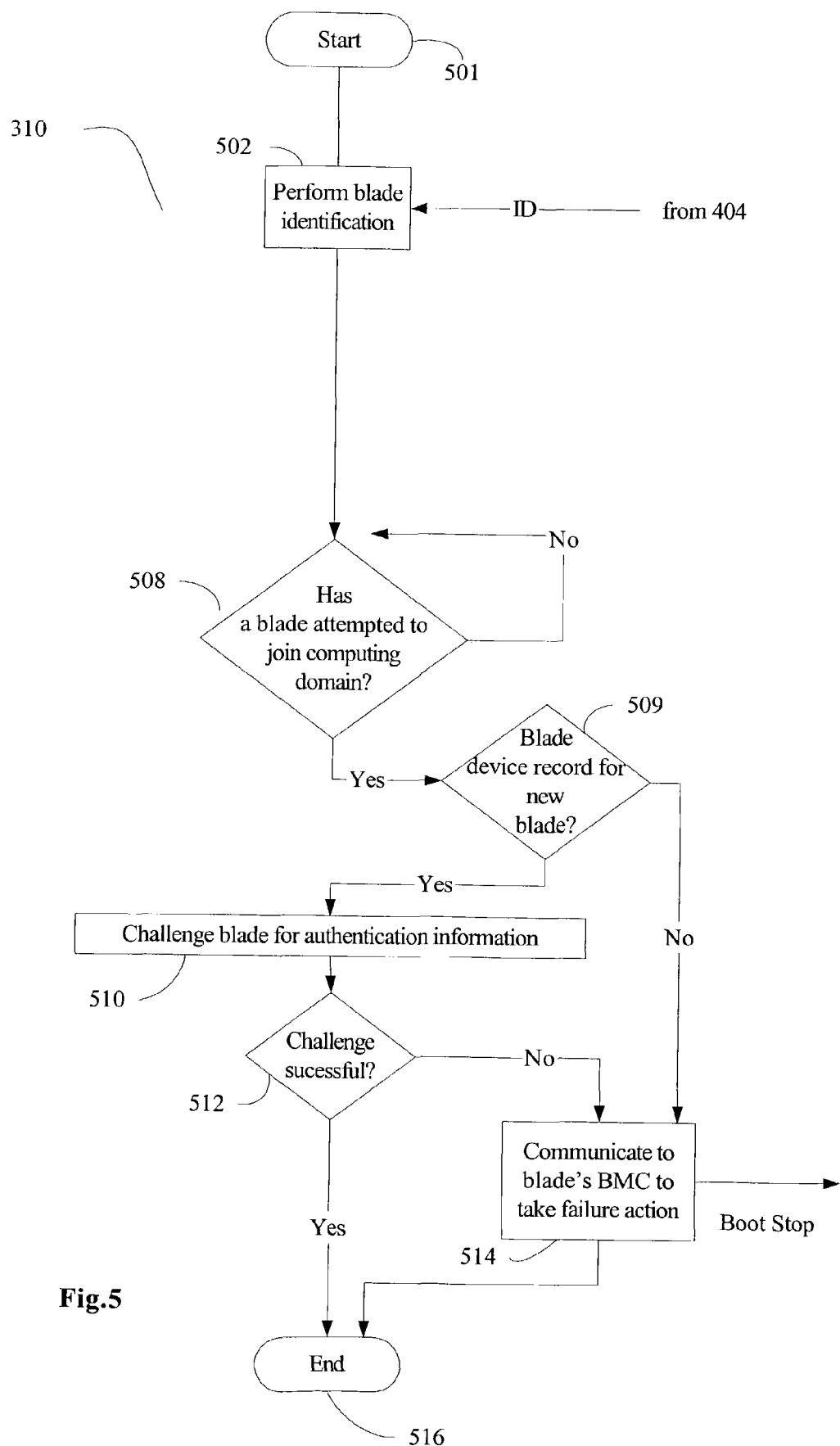
FIG. 5 is a flowchart illustrating at least one embodiment of a method of performing trust authentication for blade devices.

FIG. 5 is a flowchart illustrating a method for performing optional authentication processing 310 (FIG. 3). For at least one embodiment, the method 310 is performed by a chassis management module, such as CMM 102 (FIG. 1). FIG. 5 illustrates that authentication begins at block 501 and proceeds to block 502.

At block 502, the method performs blade device identification for the current blade. Identification 502 is based on an identifier associated with the current blade device. For at least one embodiment the identifier received at block 502 is a serial number associated with the current blade device. The identifier may reside in non-volatile memory associated with the current blade device 40. For at least one other embodiment, the identifier value for a blade device is stored in non-volatile memory of the BMC 20 associated with blade device 40. In such cases, blade device identification 502 includes receiving the blade device identifier value from the BMC 20 associated with the current blade device 40.

Processing proceeds from block 502 to block 508. At block 508, it is determined whether the current blade device is a new blade device that is not currently included in a computing domain administered by the CMM 102 (FIG. 1).

If it is determined at block 508 that the current blade device is newly attempting to join the computing domain, then processing proceeds to block 509. Otherwise, processing proceeds back to block 508. In such manner, the method 310 essentially polls to determine if a new blade device has attempted to enter the computing domain.

Figure 8:
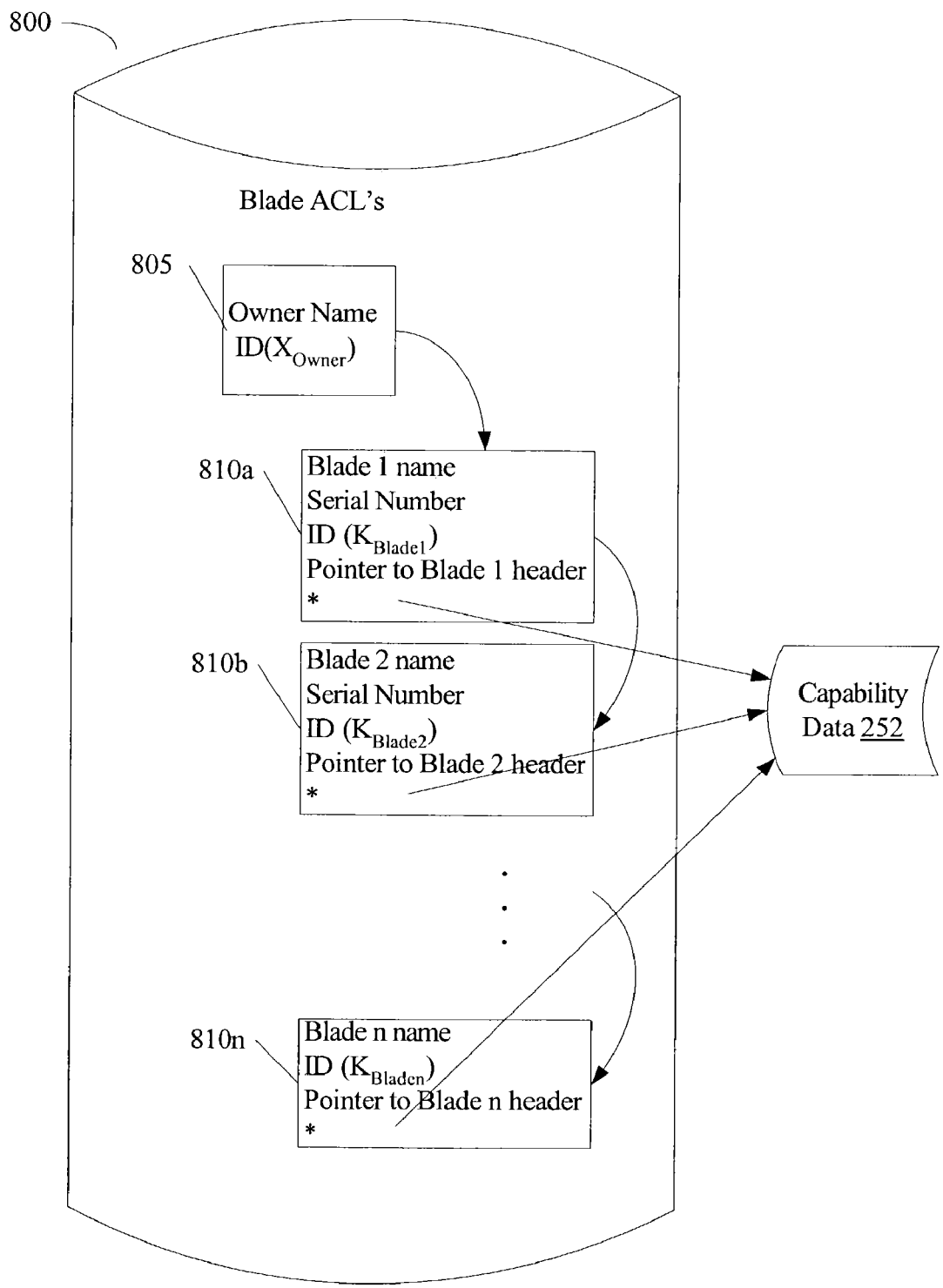
FIG. 8 is a block diagram illustrating at least one embodiment of a trust database.

At block 509 it is determined whether a record for the current blade device is present in the challenge-response data 254 (FIG. 2). Brief reference is made to FIGS. 2 and 8 for further discussion of the challenge-response data 254 that may be referenced at block 509. The challenge-response data 254 may be stored in a database. FIG. 8 illustrates an embodiment of a trust database 800 to maintain challenge-response data 254.

FIG. 8 illustrates that the trust database 800, which may be part of the CMM's trusted computing module 104 (FIG. 2), includes blade device records 810a-810n to maintain trust data for blade devices 40a-40n. The CMM 102 (FIG. 1) is thus a central repository for trust information for each of the blade devices 40a-40n. (As is discussed in further detail below, the CMM 102 may also be a central repository for capability records for each of the blade devices 40a-40n as well).

The blade records 820a-810n may be maintained as an access control list (ACL). Each grouping of associated blade records 810a-810n may be associated with an owner record 805. The owner record 805 may identify, for instance, a remote system administrator.

FIG. 8 illustrates that the owner record 805 may include a name, such as a serial number or user name, for the owner. In addition, the owner record 805 may also include some secret information, referred to as X. X is acted upon by a globally unique function, referred to as ID(.). ID(X) may be stored in the owner record 805. For at least one embodiment, ID(X) may be a salted System Administrator Password. For at least one other embodiment, ID(X) may be the SHA-1 hash of X or the capability record structure. (For additional information regarding the SHA-1 hash function, see www.itl.nist.gov/fipspubs/fip180-1.htm). For at least one other embodiment, ID(X) may be a hash of the salted MAC address of a blade or the MAC address of a blade. The information illustrated in FIG. 8 is provided by way of example. One skilled in the art will recognize that different, or additional, information may be maintained in an owner record 805.

For at least one embodiment, blade records 810a-810n are created and edited by the system administrator or other owner identified in the owner record 805. This may be accomplished via system administrator action at enterprise console (not shown) such as a Microsoft Management Console ("MMC") plug-in, HP Open view, IBM Tivoli/Director product, or Intel Server Control ("ISC").

FIG. 8 illustrates that each blade record 810 may include data related to a particular blade device 40. The information illustrated in FIG. 8 is provided by way of example. One skilled in the art will recognize that different, or additional, information may be maintained in a blade record 810. For the illustrative embodiment shown in FIG. 8, the blade record 810 includes a blade name identifier, a serial number, and a blade device identifier, $K_{blade}$.

The blade device identifier $K_{blade}$ may include a public key. The value of the blade device identifier $K_{blade}$ may depend upon the particular trust standard used for authorization. The blade device identifier $K_{blade}$ may, for example, include an attestation Identity Key (AIK). For at least one other embodiment, for example, the blade device identifier $K_{blade}$ may include the public key of a public/private key pair for RSA asymmetric cryptography.

For at least one embodiment, the bade record 810 also includes a pointer to capability data 252 such as, for instance, a capability record (see 700, FIG. 7) corresponding to the blade device 40. The blade record 810 may also includes a forward link to the next blade record 810 in the ACL.

It will be understood by one of skill in the art that, because authentication 310 takes place, for at least one embodiment, before capability registration 312 is permitted to proceed (see FIG. 3), the pointer to capability data 252 may point to a virtually empty capability record 700. The capability record 700 for a particular blade device may be populated by the blade device 40 during capability registration (see block 408 of FIG. 4)

The blade records 810a-810n may be conceptualized as a "user knob" by which an operator may drive the authentication process. For example, a system administrator may perform the addition of a blade record 810a to the trust database 800 when a new blade device 40 is purchased. As is discussed below in connection with block 509 of FIG. 5, the "user knob" can be used to drive whether or not authentication is successful. The discussion of FIG. 5, below, indicates that authentication is not successfully completed for a blade device 40 for which a blade device record 810 has not been created.

Accordingly, at block 509 it is determined whether a blade record 810 corresponding to the current blade device 40 is present in the trust database 800. For at least one embodiment, this determination is performed by searching the database 800 to determine if a record 810 exists for the identifier (such as, for example, a serial number) received at block 502.

If it is determined at block 509 that a blade record 810 corresponding to the current blade device 40 exists in the trust database, then processing proceeds to block 510. Otherwise, processing proceeds to block 514.

At block 510, the method 310 challenges the current blade device for authentication information in order to initiate a challenge-response sequence. For at least one embodiment, the challenge may be a signature check or computed challenge to the client (current blade device 40). For example, at block 510 the method 310 may send a Challenge C to the current blade.

Challenge C may be generated by asymmetrically encrypting a value, such as a random number, with the public key, $K_{public}$ for the blade. The public key, $K_{public}$, may be all or part of the blade device identifier value, $K_{blade}$, assigned to the blade device at block 506. The Challenge C may be encrypted with the public key in the following manner: C=Encrypt ($K_{public}$, random number).

For at least one embodiment, the blade device 40, upon receiving the challenge issued at block 510, decrypts the challenge C using a private key. For at least one embodiment, the challenge is decrypted in the following manner: Result=Decrypt ($K_{private}$, C). After decryption in such a manner, the decrypted result containing the decrypted challenge C is returned to the CMM 102 (or other entity that is performing the method 310).

At block 512 it is determined whether the new blade device 40 successfully responded to the challenge. That is, it is determined at block 512 whether the properly decrypted C has been received back from the current blade device 40 such that Result=random number. If so, it is assumed that the current blade device 40 is the veritable holder of secret private key, $K_{private}$. In such case, authentication is successful, and processing ends at block 516.

If it is determined at block 512 that the new blade device has not successfully responded to the challenge issued at block 510, then the authentication has failed. Accordingly, at block 514 the method 310 causes a communication that isolates the current blade device from the computing domain. For at least one embodiment, this communication, referred to as Boot Stop, is forwarded to the BMC (see 406, FIG. 4) for the current blade, and processing ends at block 516.

Isolating the blade from the computing domain may be accomplished in any of several manners. The communication generated at block 514 may result, for instance, in the current blade's BMC 20 causing the current blade device to power down. Alternatively, the communication generated at block 514 may result in the current blade device being permitted to continue to execute its boot process. However, the current blade is not permitted to join the computing domain and is, in essence, permitted to operate only in a stand-alone mode.

Figure 6:
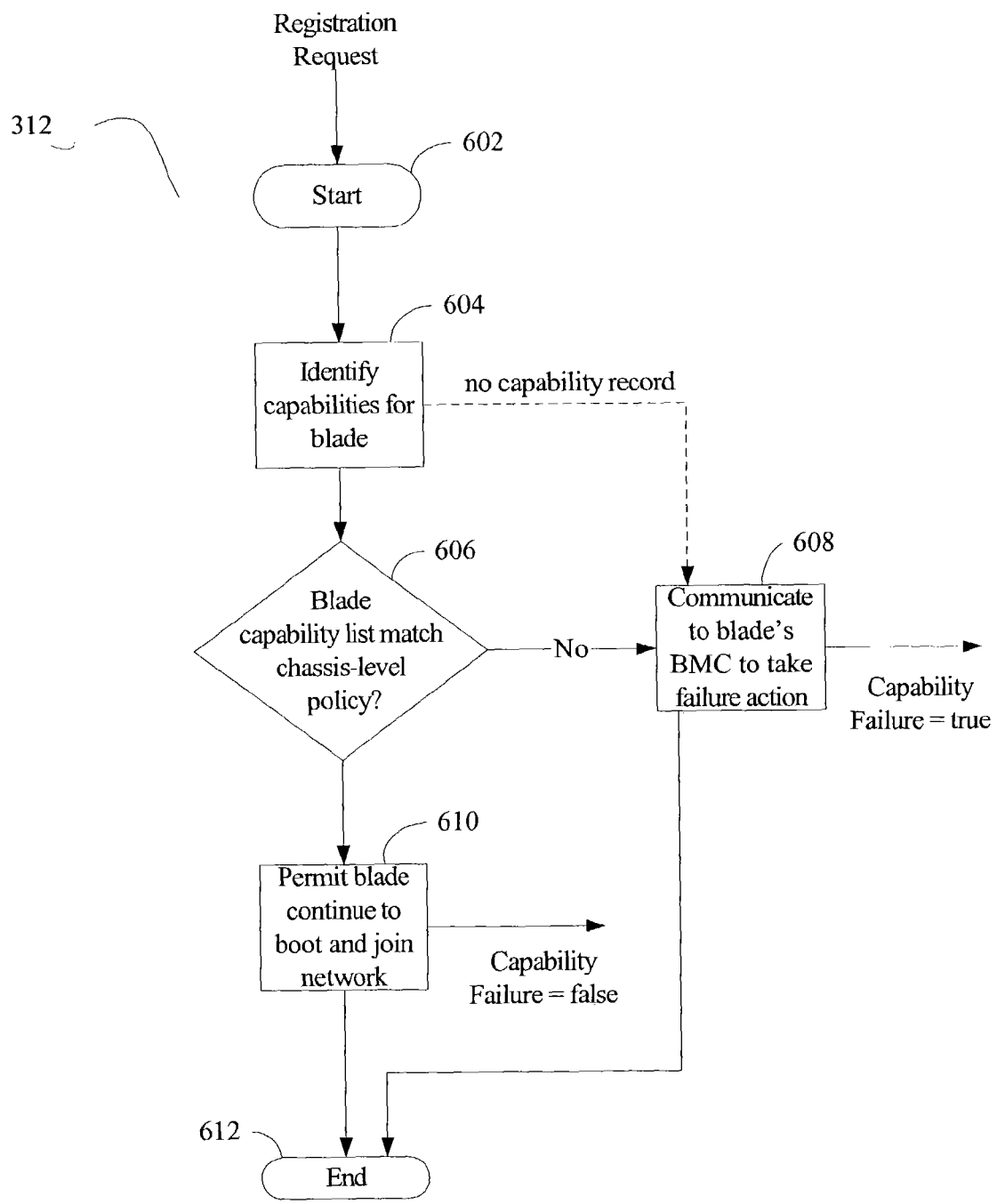
FIG. 6 is a flowchart illustrating at least one embodiment of a method for performing capability authorization for blade devices.

FIG. 6 is a flowchart illustrating a method for performing capability authorization processing 312 (FIG. 3). For at least one embodiment, the method 312 is performed by a chassis management module such as CMM 102 (FIG. 1) in response to a registration request from a blade device 40 (see 408, FIG. 4, discussed below). FIG. 6 illustrates that the method 312 begins at block 602, and proceeds to block 604.

At block 604, the method 312 identifies the capabilities for the current blade device 40. For at least one embodiment, this identification 604 is performed by identifying a capability record 700 for the current blade device 40 in the blade capabilities table 260 (FIG. 2). Capability records 700 are discussed in further detail below in connection with FIG. 7.

In embodiments for which optional authentication processing 310 is performed, it is assumed that the existence of a capability record 700 for the current blade device 40 was confirmed at block 509 of authentication processing 310 (see FIG. 5). Otherwise, identification 604 includes determining whether a capability record 700 exists for the current blade device 40. If a capability record does not exist for the current blade device 40, then processing proceeds to block 608.

After the capabilities for the current blade are identified at block 604, processing then proceeds to block 606. At block 606 it is determined whether the mandatory blade capabilities for the current blade device 40 match the capabilities required by a capability policy. For instance, the capability policy may require that a blade device 40 boot to a specified operating system and/or that the blade device 40 have an operational mode of "release mode" rather than "debug mode". The capability policy may require that the blade device 40 have a particular hardware configuration, specified storage capabilities, specified networking capabilities, and/or that it originate with a particular manufacturer.

The example policy parameters discussed herein are for purposes of example only. Any policy considerations may be implemented with the capability policy. For instance, certain parameters provided by the operating system may be considered at block 606. For example, the operating system may register certain state information, such as the active sleep state of a blade device 40, in the capability database 260. Such information may be considered at block 606 to determine whether the information comports with the capability policy.

If it is determined at block 606 that the mandatory capabilities of the current blade device 40 match the capabilities required by the capability policy, then processing proceeds to block 610. At block 610, the current blade device is permitted to continue its boot processing and to join the computing domain administered by the CMM. For at least one embodiment, such permission is granted by indicating to the blade device 40 (via the associated BMC 20) that capability failure has not occurred via a capability failure indicator value generated at block 610. Processing then ends at block 612.

If it is determined at block 606 that the mandatory capabilities of the current blade device 40 do not match the capabilities required by the capability policy, then processing proceeds to block 608. At block 608, the method 312 causes a communication that isolates the current blade device from the computing domain. For at least one embodiment, a capability failure indicator value is generated and this indicator is forwarded 608 to the BMC (see 408, FIG. 4) for the current blade, and processing ends at block 612.

As is discussed above in connection with block 514 of FIG. 5, isolating the blade from the computing domain may be accomplished in any of several manners. The communication generated at block 608 may result, for instance, power down of the current blade device 40 or may result in enforcing a stand-alone mode by preventing an operational blade device 40 from joining the computing domain.

Figure 4:
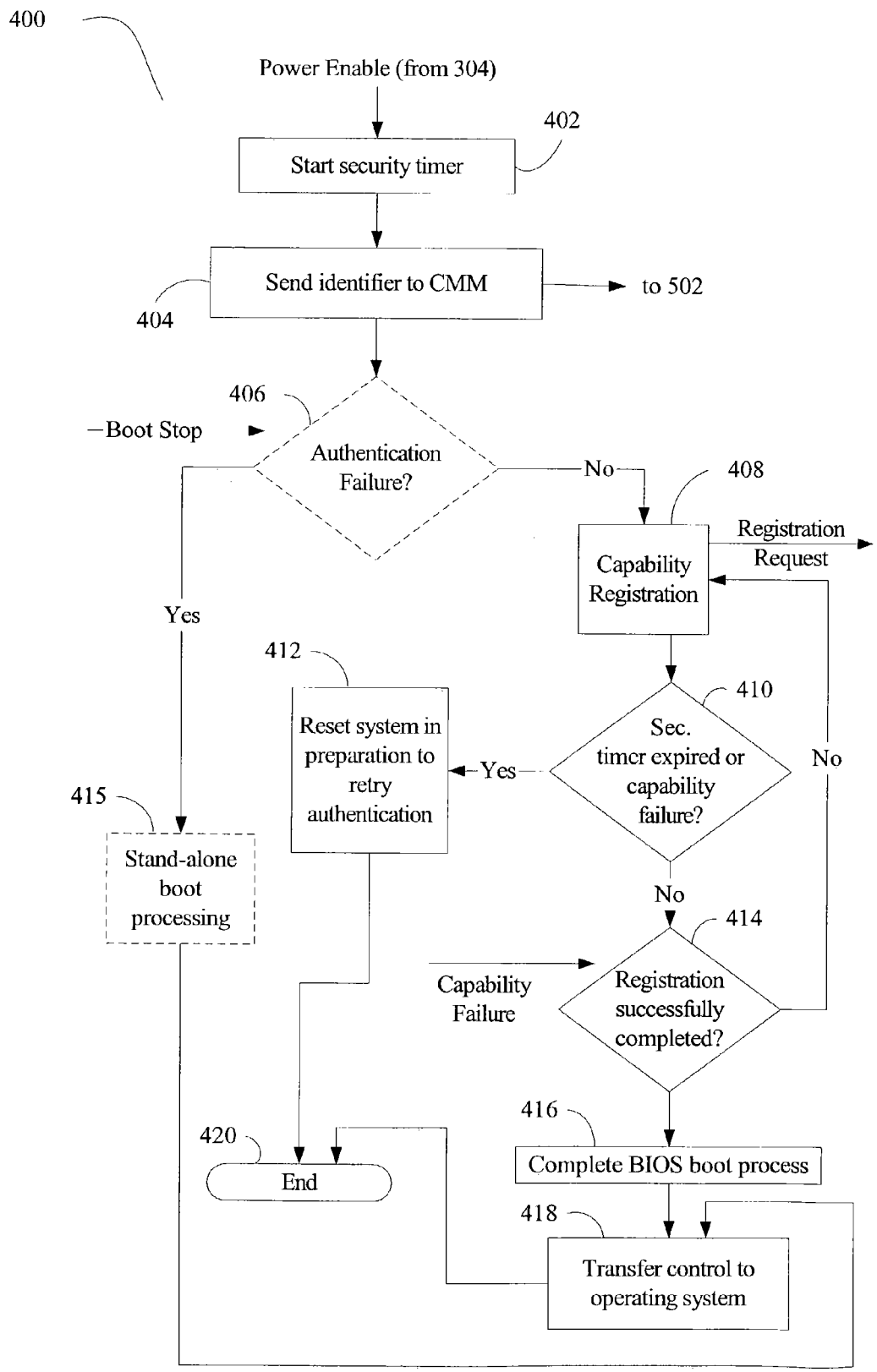
FIG. 4 is a flowchart illustrating at least one embodiment of a method for booting a blade device.

FIG. 4 is a flowchart illustrating a boot processing method 400 for powering up a blade device (such as, for example, blade devices 40a-40n illustrated in FIG. 1). Accordingly, for at least one embodiment the method 400 is performed by a blade device 40a-40n. More specifically, for at least one embodiment method 400 is performed by executing the BIOS logic 42 associated with a blade device 40. As used herein, the term "boot processing" is intended to encompass initialization processing performed at power up or upon other transition to a powered state.

FIG. 4 illustrates that processing for the method 400 begins when the blade device 40 receives a power enable indication. For at least one embodiment, the power enable indication is a software indicator rather than a hardware signal. That is, even if physical power is applied to a blade device 40, the blade device 40 will not begin its power up boot processing unless the software power enable indication has been received as illustrated in FIG. 4. For at least one embodiment, the power software power enable indication is generated by the CMM at block 302 (FIG. 3) and forwarded to the blade device 40.

Processing proceeds to block 402, where the method 400 starts a security timer. Processing then proceeds to block 404, where the blade device sends its identifier to the CMM 102 (FIG. 1). As is stated above, the identifier may be a serial number that is stored in non-volatile memory of the blade 40 and/or its associated BMC 20.

For an embodiment of the method 400 for which blade authentication is performed, processing proceeds to optional block 406. (Broken lines in FIG. 4 denote the optional nature of block 406). At block 406, the method 400 determines the value of a boot stop indicator. If the boot stop indicator contains a value that specifies that 1) authentication processing 310 (FIG. 5) was not successful and 2) as a result, the blade device 40 is to be powered down, processing ends to block 420. In this manner, the current blade device 40 declines to perform boot processing if the value of the boot stop indicator specifies that authorization has failed.

It will be understood that the boot stop indicator may contain a "not fail" value even when authentication processing 310 has not successfully completed. In such case, the blade device 40 will be permitted to power up, but will not be permitted to join the computing domain with successfully authenticated blade devices. In such case, optional stand-alone boot processing 415 is performed, and processing then proceeds to block 418.

If it is determined at block 406 that authentication processing has been successfully completed for the current blade device, then processing proceeds to block 408. Processing also proceeds to block 408, from block 404, if optional authentication processing 310 (FIG. 5) has not been performed.

At block 408, the blade device 40 initiates capability authorization processing by registering its capabilities with the CMM 102. For at least one embodiment, the BIOS 42 of the current blade device 40 transmits its capabilities to the CMM 102 via BMC 20 (FIG. 1) command encapsulations. The CMM 102 then, in response to these command encapsulations, registers the current blade device's capability data into the blade capability table 260. In order to initiate capability-based authorization processing 312 (FIG. 3) on the part of the CMM 102 (FIG. 1), the method 400 initiates a registration request at block 408.

Figure 7:
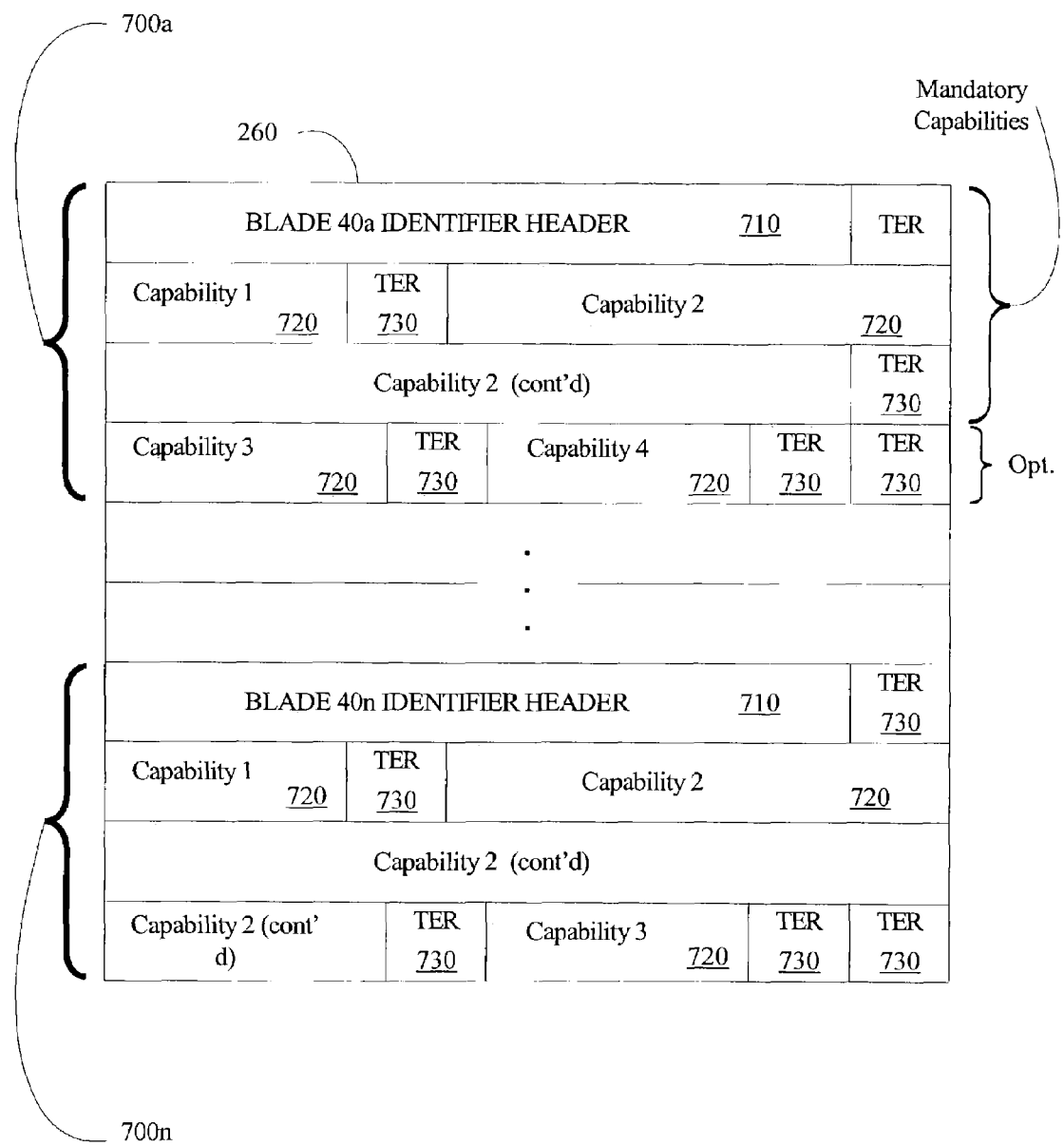
FIG. 7 is a block diagram of at least one embodiment of a blade capability table.

Brief reference is made to FIGS. 2 and 7 for a further discussion of a capability table 260 that may be updated at block 408 and that may be used to identify 604 (FIG. 6) capabilities of a current blade device 40. The blade capabilities table 260 is to store a grouping 700 of information, referred to herein as a capability record, for a blade device 40. The capability record 700 may maintain information such as processor type, operational mode of the device, networking capabilities, data storage capabilities, and operating system that the device is programmed to boot to. In addition, the capability record 700 may also capture dynamic information such as the slot ID of the blade device.

The data structure used to store the capability record 700 may vary depending on system and programming considerations. For at least one embodiment, the capability records 700a-700n are stored as a dynamic chain of descriptor nodes 720. Thus, in the capability table 260 the CMM 102 (FIG. 1) may maintain a dynamic multi-instance chain of descriptor nodes to represent the capabilities of the blade devices 40a-40n in a system.

FIG. 7 illustrates that at least one embodiment of a capability record 700 includes a header 710 also includes a capability delimiter 730 to separate each descriptor node 720. For at least one embodiment, two consecutive capability delimiters 730 imply the end of a capability record 700 for a particular blade device 40. For at least one embodiment, each capability record 700 includes a pointer value (not shown) that associates the capability record 700 with a blade record 810 associated with the same blade device 40. Such pointer may provide a security association between the two records 700, 810 associated with a particular blade device 40.

Within a capability record 700, certain descriptor nodes 720 may be identified as mandatory capabilities, while other descriptor nodes 720 may be identified as optional capabilities. Whether a descriptor 720 refers to a mandatory or optional capability is driven by the capability policy to be implemented during capability authentication processing 312.

Returning to FIG. 4, it can be seen that at block 410 it is determined whether the security timer has expired OR whether capability registration has already failed. If not, then processing proceeds to block 414 to determine whether a successful capability registration indication has been received. If the capability failure indicator has not yet been received at block 414, or if a true capability failure value has been received, then capability registration loops back to block 408. At block 408, if all capabilities have been registered, processing falls through to block 410. Otherwise, additional capability data is forwarded to the CMM at block 408 and processing then proceeds to block 410.

If it is determined at block 410 that the security timer has expired, then the current blade device has not received capability authorization within the allotted time frame, referred to herein as a "timeout interval". Similarly, if it is determined at block 410 that a true capability failure value has been received, then the current blade devices has failed capability authorization. If either case is true, the method 400 declines to compete its boot processing and processing then proceeds to block 412.

The timeout interval is a pre-determined length of time during which a blade device is required to register its mandatory capabilities and receive an indication that capability failure has not occurred. Failure of a blade device 40 to successfully register its capabilities during the timeout interval indicates that the rack-level capability policy has been violated.

At block 412 the blade device 40 performs a system reset in preparation for a future attempt to retry authentication. The blade device 40 is powered down and processing ends at block 420.

If it is determined at block 414 that capability registration has successfully completed (indicating that capability authorization has thus been granted at block 610 of FIG. 6), then processing proceeds to block 416. For at least one embodiment, the condition at block 414 evaluates to "true" if a (capability failure=false) value has been received.

At block 416, the boot processing for the blade device is completed. At block 418, control is then transferred from the blade device's 40 BIOS 42 to its operating system 44. Processing then ends at block 420.

The foregoing discussion discloses selected embodiments of an apparatus, system and methods for performing trusted computing in a blade device environment. The methods to described herein may be performed on a processing system such as the processing system 1000 illustrated in FIG. 9.

Figure 9:
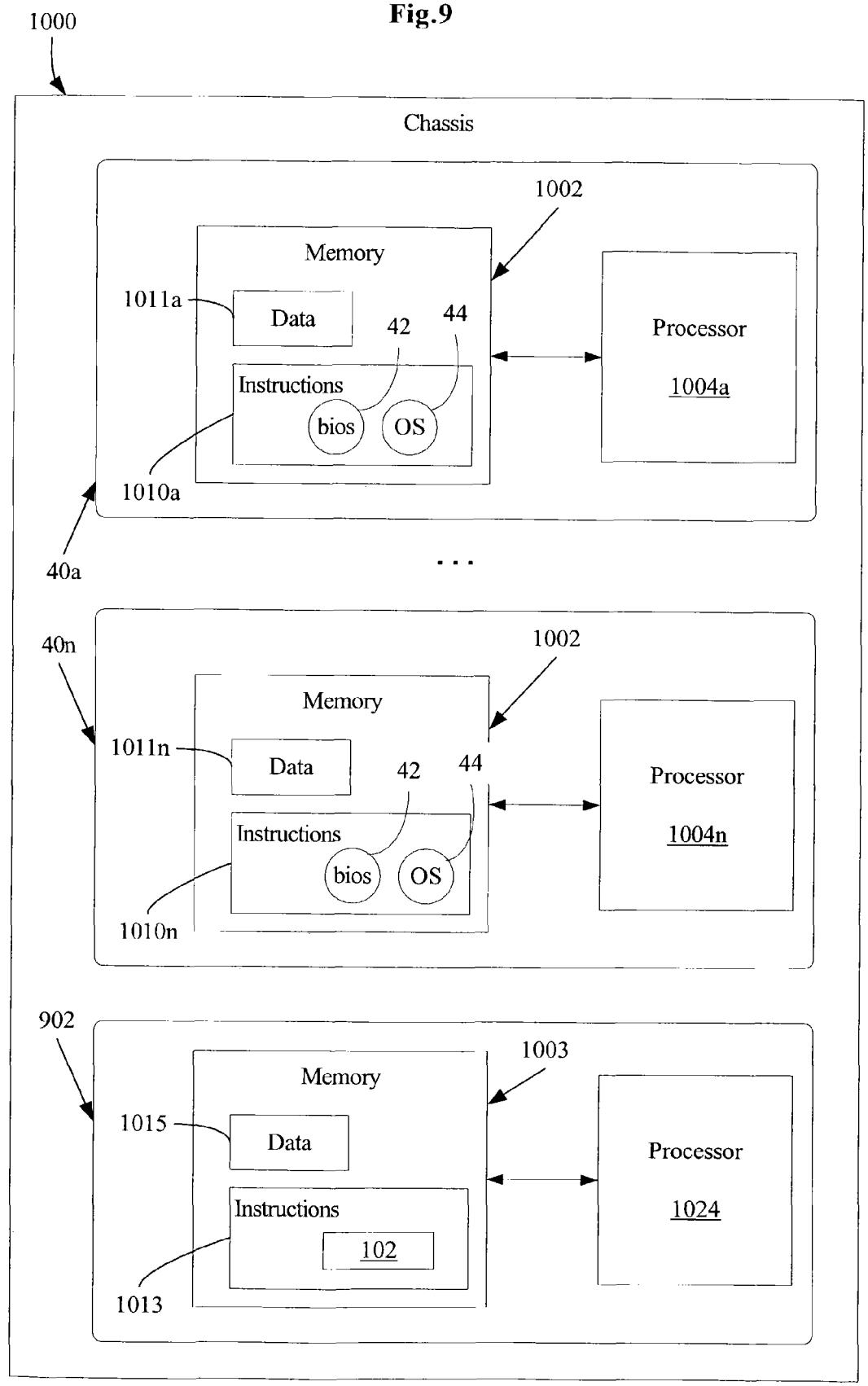
FIG. 9 is a block diagram of at least one embodiment of a blade device processing system.

FIG. 9 illustrates at least one embodiment of a processing system 1000 that may utilize disclosed techniques. System 1000 may be used, for example, to execute one or more methods that provide trusted computing in a blade environment, such as the embodiments described herein. For purposes of this disclosure, a processing system includes any system that has a processor, such as, for example; a digital signal processor (DSP), a microcontroller, an application specific integrated circuit (ASIC), or a microprocessor. System 1000 is representative of processing systems based on the Itanium® and Itanium® II microprocessors as well as the Pentium®, Pentium® Pro, Pentium® II, Pentium® III, Pentium® 4 microprocessor, all of which are available from Intel Corporation. Other systems (including personal computers (PCs) having other microprocessors, engineering workstations, personal digital assistants and other hand-held devices, set-top boxes and the like) may also be used. In one embodiment, system 1000 may be executing a version of the Windows™ operating system available from Microsoft Corporation, although other operating systems and graphical user interfaces, for example, may also be used.

Referring to FIG. 9, processing system 1000 includes a plurality of blade devices 40a-40n and also includes a backplane processor 902. Each of the blade devices 40a-40n include a memory system 1002 and a processor 1004. Memory system 1002 may store instructions 1010 and data 1011 for controlling the operation of the processor 1004. For at least one embodiment, instructions 1010 includes BIOS 42 and operating system 44. For at least one embodiment, the BIOS 42 includes instructions for performing the method 400 illustrated in FIG. 4.

Memory system 1002 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1002 may store instructions 1010 and/or data 1011 represented by data signals that may be executed by processor 1004.

FIG. 9 further illustrates that the backplane processor 902 may include a memory system 1002 and a processor 1024. The processor 1024 may the same type of processor 1004 that is included within a blade device, but it need not be. Memory system 1002 may store instructions 1010 and data 1011 for controlling the operation of the processor 1004.

Instructions 1010 of the backplane processor 902 may include a CMM 102. The CMM 102 may include instructions for performing registration authentication processing 312. For at least one embodiment, CMM 102 in instructions 1010 of the backplane processor 902 may include instructions for performing optional authentication processing 310.

Memory system 1003 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 1003 may store instructions 1013 and/or data 1015 represented by data signals that may be executed by processor 1024.

In the preceding description, various aspects of a method, apparatus and system for trusted computing in a blade device environment are disclosed. For purposes of explanation, specific numbers, examples, systems and configurations were set forth in order to provide a more thorough understanding. However, it is apparent to one skilled in the art that the described method and apparatus may be practiced without the specific details. In other instances, well-known features were omitted or simplified in order not to obscure the method and apparatus.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. A system comprising:
 a blade device; and
 chassis management logic, the chassis management logic to determine whether one or more capabilities associated with the blade device match a capability policy;
 the chassis management logic further to isolate the blade device from a computing domain responsive to determining that the blade device capabilities do not match the capability policy; and
 a central repository, couple to the chassis management logic, to hold a plurality of public key values, each of the public key values corresponding to one of a plurality of blade devices.

2. The system of claim 1, further comprising:
 a data communication pathway coupled to the blade device and to the chassis management logic.

3. The system of claim 2, further comprising:
 a plurality of blade devices;
 wherein each of the plurality of blade devices is coupled to the data communication pathway; and
 wherein the chassis management logic is further to determine, for at least one of the plurality of blade devices, whether blade capabilities associated with the at least one blade device match the capability policy.

4. The system of claim 3, wherein:
 the chassis management logic is further to isolate from the computing domain any of the plurality of blade devices whose associated capabilities do not match the capability policy.

5. The system of claim 1, wherein:
 the chassis management logic is further to determine whether the blade device is trusted.

6. The system of claim 1, further comprising:
 a baseboard memory controller, wherein the baseboard memory controller is to control communication between the blade device and the chassis management logic.

7. The system of claim 1, wherein:
 the blade device includes logic to perform boot processing.

8. The system of claim 7, wherein:
 the chassis management logic is further to generate a failure indicator value responsive to determining that the blade device capabilities do not match the capability policy; and
 the blade device is to, responsive to the failure indicator value, terminate the boot processing.

9. The system of claim 1, further comprising:
 a chassis to receive the blade device.

10. A method comprising:
 determining if one or more capabilities associated with a blade device match a capability policy;
 if the blade device capabilities do not match the capability policy, isolating the blade device from a computing domain; and
 maintaining in a central repository a plurality of public key values, each of the public key values corresponding to one of a plurality of blade devices.

11. A method comprising:
 determining if one or more capabilities associated with a blade device match a capability policy;

if the blade device capabilities do not match the capability policy, isolating the blade device from a computing domain;

challenging the blade device to provide a response; and if the blade device does not provide the response, isolating the blade device from the computing domain;

wherein the challenging further comprises:

encrypting a challenge value using a public key value; and providing the encrypted challenge value to the blade device.

12. The method of claim 10, wherein determining further comprises:

accessing a capability record associated with the blade.

13. The method of claim 10, further comprising:

maintaining in a central repository a plurality of capability records, each capability record being associated with one of a plurality of blade devices.

14. An article comprising:

a machine-readable storage medium having a plurality of machine accessible instructions, which if executed by a machine, cause the machine to perform operations comprising:

registering one or more capabilities with a central repository;

determining if one or more capabilities associated with a blade device match a capability policy;

if the blade device capabilities do not match the capability policy, isolating the blade device from a computing domain; and maintaining in a central repository a plurality of public key values, each of the public key values corresponding to one of a plurality of blade devices.

15. An article comprising:

a plurality of machine accessible instructions, which if executed by a machine, cause the machine to perform operations comprising:

registering one or more capabilities with a central repository;

determining if one or more capabilities associated with a blade device match a capability policy; and if the blade device capabilities do not match the capability policy, isolating the blade device from a computing domain;

challenging the blade device to provide a response; and if the blade device does not provide the response, isolating the blade device from the computing domain wherein challenging further comprises instructions that, when executed, cause the machine to:

encrypt a challenge value using a public key value; and provide the encrypted challenge value to the blade device.

16. The article of claim 14, wherein:

the instructions that cause the machine to determine if one or more capabilities associated with a blade device match a capability policy further comprise instructions that cause the machine to access a capability record associated with the blade.

17. The article of claim 14, further comprising:

a plurality of machine accessible instructions, which if executed by a machine, cause the machine to perform operations comprising:

maintaining in a central repository a plurality of capability records, each capability record being associated with one of a plurality of blade devices.

18. The system as recited in claim 1 wherein the chassis management logic further comprises authentication logic to determine whether the blade device is to be authenticated before determining whether one or more capabilities associated with the blade device match the capability policy.

19. The system as recited in claim 1 wherein the chassis management logic is to register the one or more capabilities associated with the blade device with a central repository, and determine whether the one or more registered capabilities associated with the blade device match the capability policy, resulting in a capability authorization;

wherein the chassis management logic is to allow boot processing of the blade device if the capability authorization has been received during a predetermined timeout interval; and wherein the chassis management logic is further to disallow boot processing of the blade device if the capability authorization has not been received within the predetermined timeout interval.

* * * * *